United States Patent [19]

Kessler et al.

[11] Patent Number: 4,982,206
[45] Date of Patent: Jan. 1, 1991

[54] LASER PRINTER HAVING AN APODIZINE MASK

[75] Inventors: David Kessler, Rochester, N.Y.; Chris P. Brophy, Tucson, Ariz.

[73] Assignee: Eastman Kodak Company, Rochester, N.Y.

[21] Appl. No.: 293,023

[22] Filed: Jan. 3, 1989

[51] Int. Cl.⁵ .................... G01D 15/16; G03H 1/16
[52] U.S. Cl. ................................ 346/108; 350/3.82
[58] Field of Search ............... 346/108, 107 R, 76 L; 358/296, 75; 350/3.82

[56] References Cited

U.S. PATENT DOCUMENTS

| | | | |
|---|---|---|---|
| 4,013,338 | 3/1977 | Sato et al. | 350/3.82 |
| 4,467,334 | 8/1984 | Anzai | 346/108 |
| 4,588,269 | 5/1986 | Kessler | 350/619 |
| 4,619,892 | 10/1986 | Simpson et al. | 430/505 |
| 4,631,551 | 12/1986 | Vergona | 346/108 |
| 4,681,427 | 7/1987 | Plummer | 355/32 |
| 4,728,965 | 3/1988 | Kessler et al. | 346/108 |
| 4,821,113 | 4/1989 | McQuade et al. | 358/302 |

*Primary Examiner*—Mark J. Reinhart
*Attorney, Agent, or Firm*—Donald D. Schaper

[57] ABSTRACT

A laser printer is disclosed which is adapted to be used for color imaging. The printer comprises three diode lasers, each of which emits at a different wavelength. Each laser beam is passed through an apodizing mask to trim the final spot size. The beams from the three lasers are combined by the use of dichroic mirrors to form one combined beam. The combined beam is shaped by two spherical mirrors and is scanned onto a receiving medium by a polygon. The receiving medium is sensitive to the infrared, and the diode lasers are selected to obtain the widest possible spectral separation in the light beams from the lasers.

4 Claims, 4 Drawing Sheets

LASER PRINTER HAVING AN APODIZINE MASK

CROSS REFERENCE TO RELATED APPLICATIONS

Reference is made to commonly-assigned U.S. Patent Applications: Ser. No. 293,029, entitled "Laser Printer", filed in the name of C. Brophy on even date herewith, and Ser. No. 293,024, entitled "Laser Printer", filed in the name of J. C. Owens et al. on even date herewith.

BACKGROUND OF THE INVENTION

1. Field of the Invention

This invention relates to a laser printer, and more particularly to such a printer which is adapted to be used for color imaging.

2. Description of the Prior Art

Laser printers are used in photograPhy and in the graphic arts for printing on a receiving medium such as film. When such printers are used for color imaging, they generally include a seParate channel for each of the primary colors. In U.S. Pat. No. 4,728,965, for example, there is disclosed a laser printer which includes three optical channels, and each channel includes a gas laser which projects a beam of intense coherent light at a predetermined wavelength. The intensity of the light beam in each channel is modulated by an acoustooptic modulator in accordance with an electrical signal representing image information for one of the primary colors. The three beams of light are combined by a beam combiner, and the combined light beam is scanned onto a receiving medium by a rotating polygon.

In recent years, there have been attempts to use diode lasers instead of gas lasers in laser printers. The use of diode lasers reduces the cost of the printer and permits a drastic reduction in the size and complexity of the printer. Diode lasers can be modulated directly at frequencies as high as several hundred MHz by simply modulating the drive current, and thus, no external modulators are required. Further, the low intrinsic noise of diode lasers makes it possible to eliminate the high-bandwidth servo controls used for noise cancellation in gas laser printers. There are, however, problems which have to be solved in using diode lasers in printers for the graphics arts. One of the problems is that available gallium aluminum arsenide diode lasers emit light in the infrared. As a result, a special recording material which is sensitive to the infrared must be used, and the diode lasers in a multilaser system must be carefully selected to obtain the widest possible spectral separation between the lasers. There are also problems in superimposing the diode laser beams in color systems to form a combined beam having the desired polarization and in shaping the combined beam to obtain high quality, continuous tone images.

SUMMARY OF THE INVENTION

It is an object of the present invention to overcome the problems discussed above in the prior art and to provide an improved laser printer.

In accordance with one aspect of the invention, there is provided a laser printer comprising: three diode lasers, each of the lasers being adapted to emit a beam of light at a wavelength different from the other lasers; means for shaping the beams of light from each of the lasers; means for combining the beams of light to form a combined beam of light; means for shaping the combined beam; and means for scanning the combined beam onto a receiving medium.

In one embodiment of the present invention, a laser printer comprises three diode lasers which are mounted in a generally circular arrangement. Each of the lasers emits light at a different wavelength, and each laser beam is modulated in accordance with an image signal which represents one of the primary colors. In order to trim the final spot size, each of the laser beams is passed through an elliptical opening in an apodizing mask. After passing through the apodizing masks, the beams from the three lasers are superimposed by means of two dichroic mirrors to form a combined beam. The combined beam is shaped by two spherical mirrors and is scanned onto a receiving medium by a polygon. A cylinder mirror, located between the polygon and the receiving medium, serves to image a polygon facet onto the receiving medium in the cross scan direction.

A principal advantage of the present invention over known laser printers is that the size and complexity of the printer has been substantially reduced, and the reliability has been improved. The diode lasers can be modulated directly at frequencies as high as several hundred MHz by simply modulating the drive current, and thus, no external acoustooptic modulators and associated optics are required. The laser beams in the disclosed printer are combined and shaped in a manner to give optimum performance.

Other features and advantages will become apparent upon reference to the following description of the preferred embodiment when read in light of the attached drawings.

DESCRIPTION OF THE PREFERRED EMBODIMENT

Figure 1:
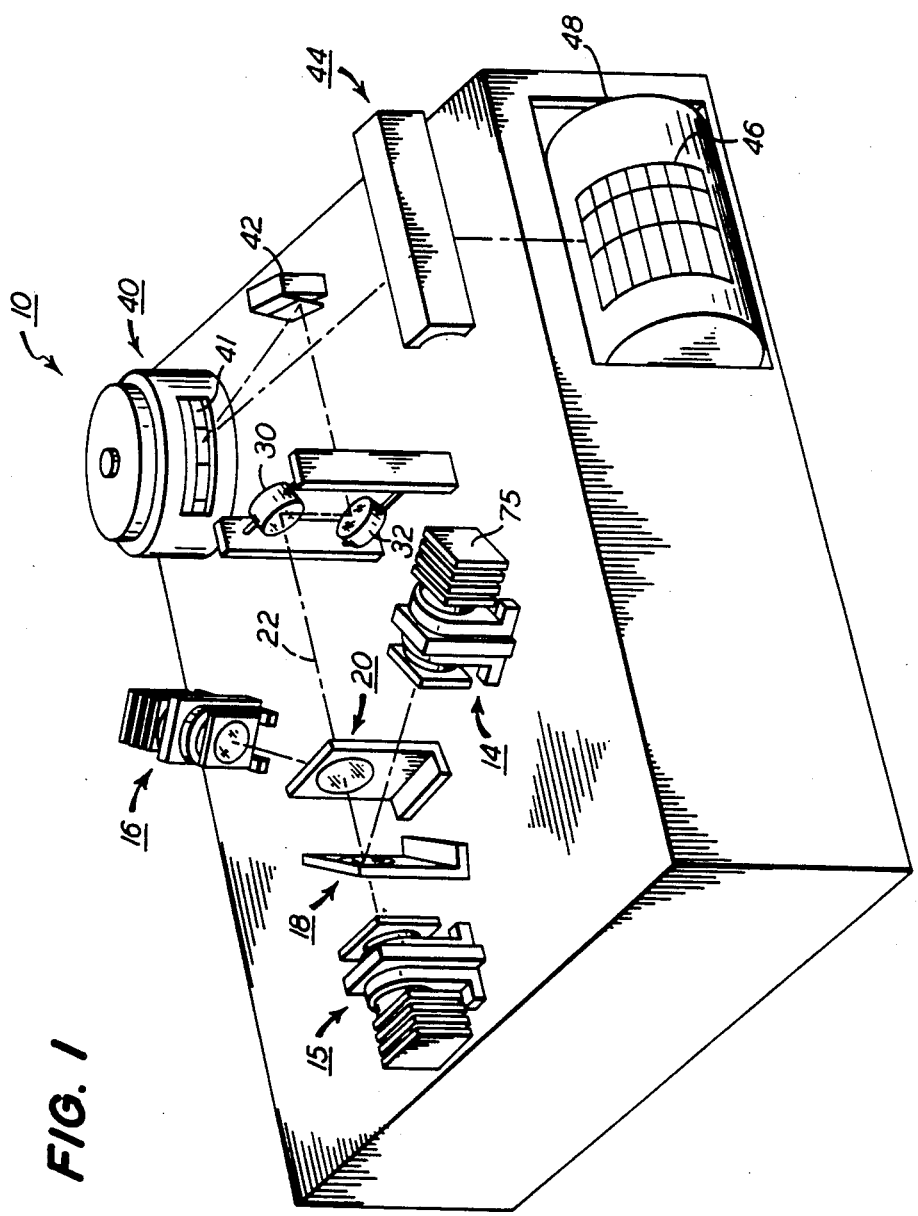
FIG. 1 is a perspective view of the laser printer of the present invention.

With reference to FIG. 1, there is shown a diode laser printer 10 constructed in accordance with the present invention. Printer 10 comprises three optical heads which are designated 14, 15, and 16. The optical heads 14–16 are disposed in a circular arrangement and are spaced 120° apart. Beams from optical heads 14 16 are combined by dichroic mirrors 18 and 20. A combined beam from mirrors 18 and 20 travels along an optical axis 22 to spherical mirrors 30 and 32.

The combined beam reflected from spherical mirror 32 is directed onto a rotatable polygon 40 by a turning mirror 42. Polygon 40 scans the beam across a cylinder mirror 44 which directs the beam onto a receiving medium 46. Receiving medium 46 is mounted on a rotatable drum 48.

Figure 2:
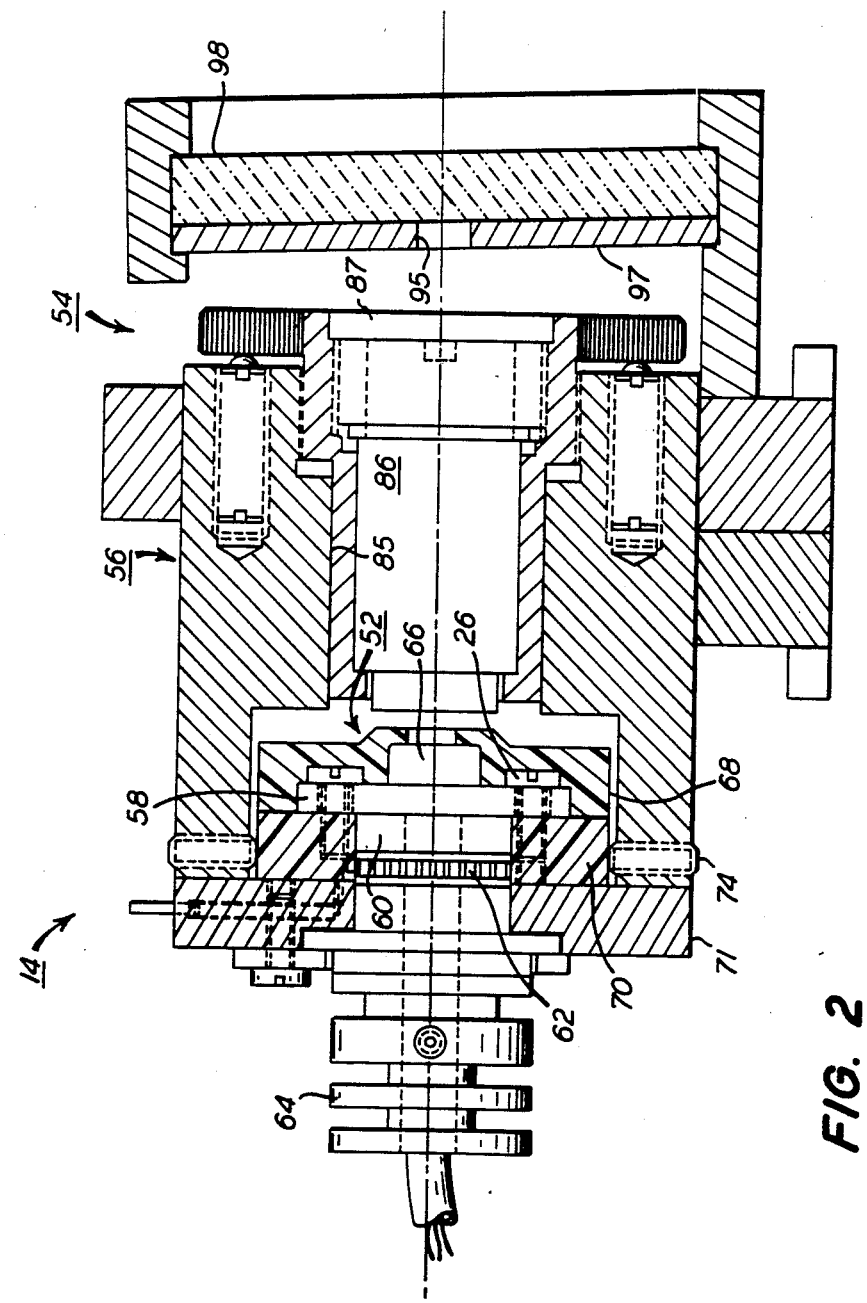
FIG. 2 is a side elevational view of an optical head used in the present invention, with certain parts shown in section.

Each of the optical heads 14–16 can be constructed as shown in FIG. 2. Such a head is disclosed in detail in commonly assigned U.S. Patent Application Serial No. 238,225, entitled "Athermalized Optical Head", filed Aug. 30, 1988, in the name of Thomas E. Yates; and the disclosure in Application Ser. No. 238,225, is expressly incorporated herein by reference. Each of the optical heads 14–16 is generally the same, and thus, only optical head 14 will be described herein. As shown in FIG. 2, optical head 14 comprises a light source 52 and an optical device 54, both of which are supported in a tubular support 56.

Light source 52 includes a diode laser 58, a thermal transfer plate 60, a thermoelectric cooling element 62, and a heat sink 64. Diode laser 58 is surrounded at an output side 66 by a cover 68 which is formed of an insulator material, such as No. 106 silicone, obtainable from the RTV Corp. Diode laser 58 is mounted by means of fasteners 26 to an insulator ring 70 which is made of a glass filled polycarbonate, for example, such a material sold under the trademark Lexan 3414 by General Electric Co. Insulator ring 70 is mounted to an annular laser mount 71 by means of fasteners (not shown). Laser mount 71 can be, for example, copper. Set screws 74 in support 56 are threaded into contact with insulator ring 70 to align light source 52 relative to optical device 54. Heat from diode laser 58 is transferred to heat sink 64 which expels the excess heat through a finned radiator 75 (FIG. 1) to the environment.

In order to achieve good tone and color reproduction, the diode lasers in printer 10 must have the widest possible spectral separation and dynamic range. Laser 58 in optical head 14 emits at 810 nm (5 mW) and can be a number LT010MF, obtainable from the Sharp Company. The laser in optical head 15 emits at 870 nm (20 mW) and can be a number 8312E, manufactured by Hitachi Corporation. The laser in optical head 16 emits at 750 nm (5 mW) and can be, for example, a number LT030MF, which is manufactured by Sharp. Although diode lasers having shorter wavelengths are now available, it has been found that their dynamic range, that is the ratio of maximum power to power at the lasing threshold, is inadequate for continuous tone printing.

Optical device 54 includes a lens housing 85, a collimator lens 86 in the housing, and a threaded lens retainer 87. Diode laser 58 and lens 86 are mounted in optical head 14 such that the distance between the diode laser and the lens is maintained constant over a predetermined temperature range. Collimator lens 86 can be, for example, an Olympus lens, No. AV8650-2. A neutral density filter 98 is included in each optical head 14–16 to maximize the dynamic range by making it possible for each laser to operate at its maximum output. As shown in FIG. 2, filter 98 is mounted at a slight angle to the optical axis, for example, 5° in order to prevent optical feedback to the laser 58. Because the lasers differ significantly in beam divergence, a hard-edged apodizing mask 97 is also included in each optical head 14–16 to trim the beam so that the proper spot size is obtained at the final image plane. Each of the apodizing masks 97 includes an elliptical aperture 95; a section along the minor radius oF elliptical aperture 95 is shown in FIG. 2. In one representative example, the elliptical apertures for printer 10 are sized, as follows:

Head 14—$w_y=0.0524$, $w_x=0.1693$, n=86%
Head 15—$w_y=0.0531$, $w_x=0.1693$, n=84%
Head 16—$w_y=0.0492$, $w_x=0.1575$, n=84% where $w_y$, the minor radius of the ellipse, is in the cross scan direction; $w_x$, the major radius, is in the scan direction; n is the ratio of beam power through the aperture to incident power; and all of the dimensions are in inches.

Figure 3:
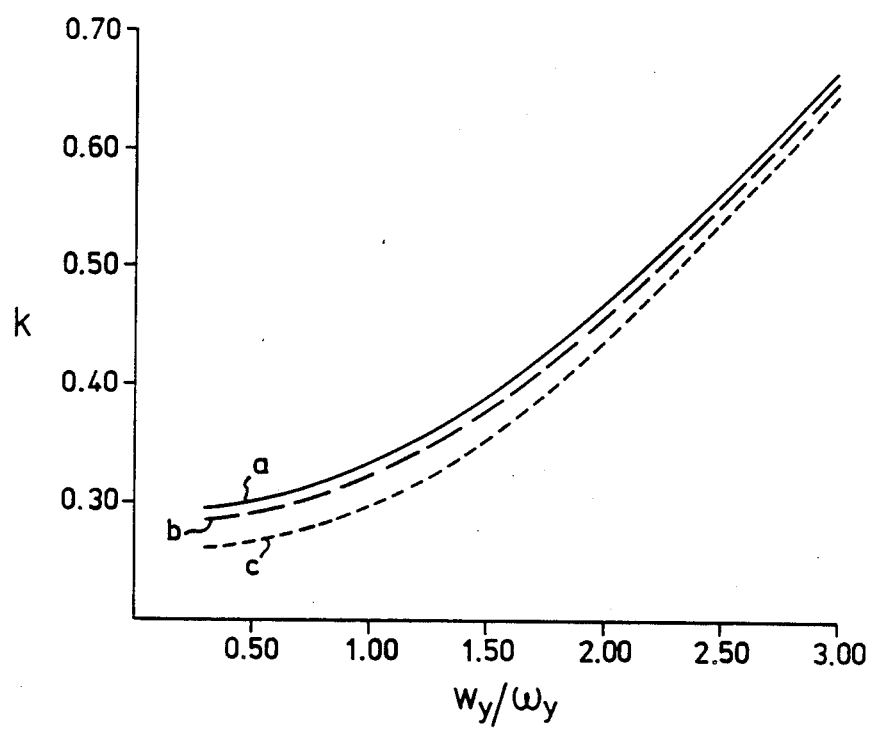
FIG. 3 is a graph showing the normalized radius of the far field intensity versus the ratio of the radius of the truncating ellipse to the input beam waist.

Another advantage of using the apodizing masks is shown in FIG. 3 in which k, the normalized radius (at the 40% peak level) of the far field intensity, is plotted against $w_y/\omega_y$, the ratio of the radius of the truncating ellipse to the input beam waist. In FIG. 3, curve (a) is for $w_x/\omega_x=0.3$, curve (b) is for $w_x/\omega_x=1.0$, and curve (c) is for $w_x/\omega_x=3.0$. It will be seen from FIG. 3, that for truncation ratios of unity, or less, the far field width is relatively insensitive to laser divergence. This is advantageous because individual laser divergences routinely vary by as much as 10% from their nominal values, and hence apodization minimizes variation in final spot size. Yet another advantage of apodization is that it increases the contrast ratio of lasers by helping to suppress the incoherent light emitted relative to the coherent light.

The three collimated beams from optical heads 14–16 are superimposed using two slightly wedged dichroic plates, or mirrors, 18 and 20. As shown in FIG. 1, mirrors 18 and 20 are disposed such that the normals to mirrors 18 and 20, respectively, are both at a 30° angle to the optical axis 22, and the mirrors 18 and 20, each form an angle of 60° with optical axis 22. Mirrors 18 and 20 are at an angle of 60° to each other. The beam from optical head 14 impinges on mirror 18 at a 30° angle of incidence and is combined with the beam from optical head 15. The beam from optical head 16 impinges on mirror 20 at a 30° angle of incidence and is superimposed on the beams from heads 14 and 16 to form a combined beam which is directed along optical axis 22 to spherical mirror 30. The polarization of the diode laser output from heads 14–16 is parallel to the laser junction and hence to the minor axis of the elliptical beam. Since the beams pass through the same optical elements after being combined by mirrors 18 and 20, they must have the same ellipse alignment. No polarization rotators are used in apparatus 10, and hence, polarizations of the beams must also be aligned. Coatings on mirrors 18 and 20 serve as modified long wave pass filters of a type which permit all three beams to have the same polarization; the coatings are produced from dielectric oxides in a known manner.

The 40% radius of the focused spot in the present invention is about 24 μm for the middle beam (810 nm) in the scan plane. Assuming the spot is of Gaussian shape, the waist, or $1/e^2$ radius, will be about 30 μm, and the waist of the actual spot given by the truncated beam is about 35 μm. This value is used so that when it is convolved with the pixel size (78.15 μm), the effective written spot in this direction will have the same modulation transfer function (MTF) as the spot in the cross-scan direction. Ideally, the waists in the other beams are scaled to this beam by the square root of their wavelengths in order to match the spot defocus of all beams over the scan line. This ensures that the ratio of the three spot sizes will remain constant over the length of the scan line.

Anamorphic beam shaping is accomplished in scanner 10 by the use of the spherical mirrors 30 and 32. A tilted spherical mirror generates large astigmatism, providing a natural and achromatic method for focusing the combined beams on the polygon in the cross scan direction and on the image in the scan direction. The combination of two tilted spherical mirrors gives a compact solution with an additional and useful degree of freedom. Many configurations of two tilted spheres will generate the required astigmatism; the particular combination used was selected for its properties of maintaining the same beam direction and relative insensitivity to spacing. There are four parameters: the radii of the mirrors 30 and 32, the common tilt angle I, and the distance t between the mirrors. There are three conditions which must be satisfied: the proper focal lengths in the scan and cross scan directions and the proper difference between the back focal length in the scan direction and the back focal length in the cross scan direction. The distance t between the mirrors was chosen to be the free parameter in order to obtain a compact design. One suitable design is, as follows:

R (mirror 30)=304.8 mm (concave)
R (mirror 32)=431.2 mm (convex)
I=37.5°
t=52.3 mm A more complete discussion of spherical mirrors, as used in the present invention, can be found in commonly-assigned U.S. Pat. No. 4,588,269 entitled "Apparatus Which Shapes Gaussian Beams By Spherical Mirrors", issued on May 13, 1986, in the name of David Kessler.

Polygon 40 can have, for example, 14 facets 41, and the polygon can be rotated at a speed of 7,380 rpm. Polygon 40 has diamond machined facets 41, rotates on a self pumped air bearing (not shown), and is controlled by a phase locked servo system. A combination polygon and drive motor suitable for printer 10 is a Model No. ZS-009, manufactured by Copal.

For high quality continuous-tone imaging, objectionable banding artifacts, such as those due to wobble or pyramid angle error in the polygon 40, must be reduced below visible levels. Generally the variation in pixel placement must be kept below one one thousandth of the pixel spacing to avoid visible artifacts. In the present invention, cylinder mirror 44 images the scanner plane onto the image plane in the cross-scan direction. The magnification is selected so that the residual out-of-plane motion of the polygon facet, as it rotates, does not result in excessive spot misplacement at the end of the scan. A cylinder mirror which can be used in the present invention has a radius of curvature which is equal to 124.75 mm.

One advantage of the present invention is that, for certain ranges of scan length and resolution, it is not necessary to use a field flattening, or f-$\theta$, lens following the polygon 40. Such an advantage is obtained, for example, when the optical elements disclosed herein are used to produce a four inch scan line at a resolution of 325 pixels/inch.

Figure 4:
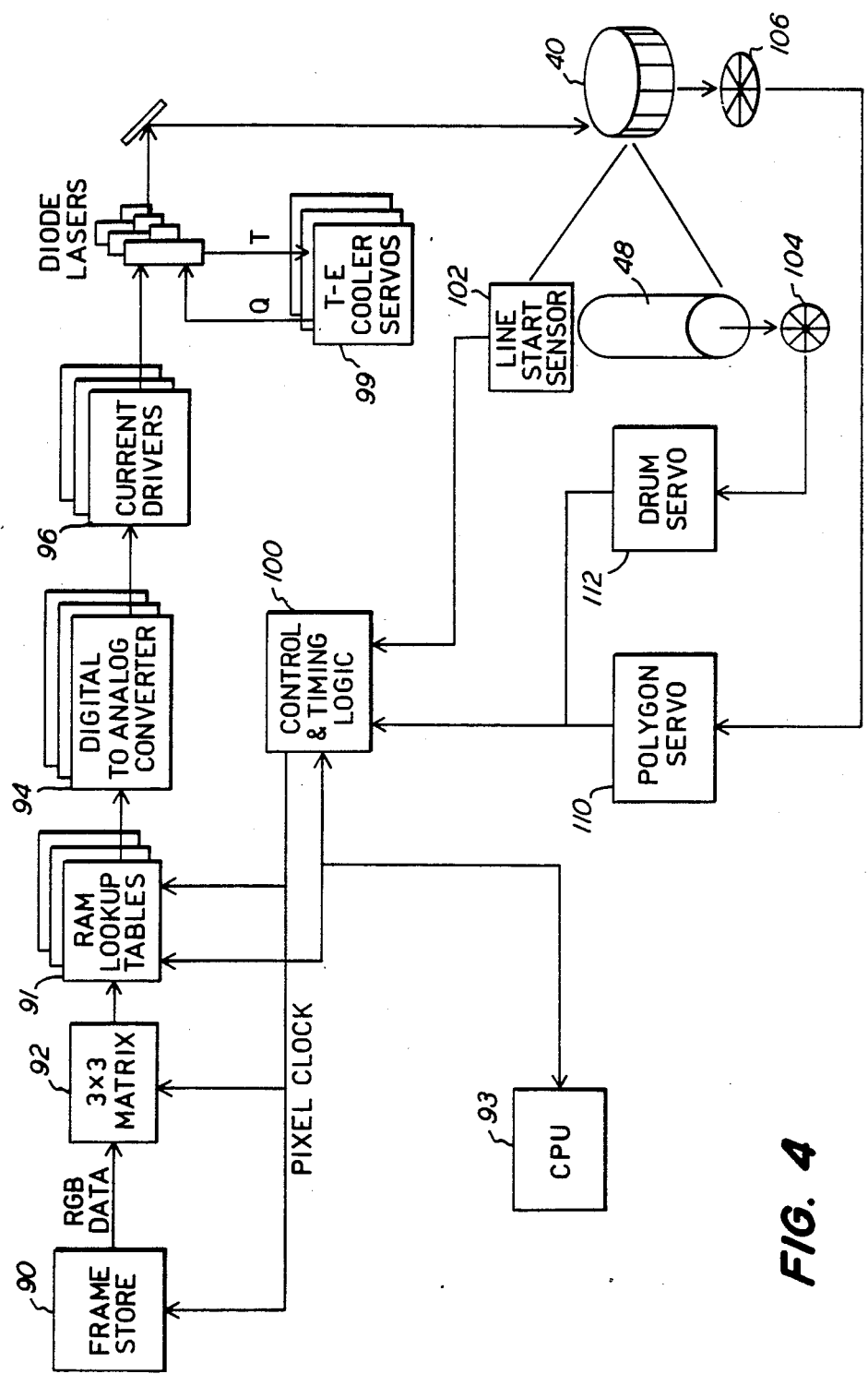
FIG. 4 is a block diagram of the electronic elements in the present invention.

A control system 89 for printer 10 is shown in FIG. 4. Control system 89 comprises a frame store 90 for storing image data received From an image scanner or from an image storage medium( not shown). The data stored in frame store 90 includes, for example, three 8-bit values for each pixel, each value representing the red, green, or blue input for the pixel. A matrix multiplication circuit 92 multiplies the 8-bit red, green; and blue values by a 3×3 matrix in order to effect desired color corrections.

The output from circuit 92 is applied to RAM lookup tables 91 which perform the necessary scaling for linearization, calibration, compensation for the mismatch of the sensitometric curves of the three color layers of the recording material, and correction for facet-to facet reflectivity variations of the polygon 40. Updated values for the lookup tables 91 can be provided by a central processing unit 93. The digital outputs from lookup tables 91 are provided to digital to analog (D/A) converters 94, and the outputs from the D/A converters drive the voltage to current drivers 96 for the diode lasers. Thermoelectric coolers for the diode lasers are controlled by thermoelectric cooler servos 99.

A control and timing logic circuit 100 is provided to manage the data flow during the operation of printer 10 and to control the printer timing. Circuit 100 accepts timing signals from a drum servo 112, a polygon servo 110, and an optical fiber line start sensor 102, and uses these signals to synchronize the printing operations. These timing signals include a once per revolution pulse from drum servo 112 which receives inputs from an encoder 104, a once per-facet pulse from servo 110 which receives inputs from an encoder 106, and a line start pulse that is generated when the laser beam crosses an optical fiber (not shown) in line start sensor 102. Upon receipt of these signals, a pixel clock is started and the data is clocked through the data circuits. Also included in circuit 100 are a pixels per line counter for line length control and a facet counter for controlling the addressing of the lookup tables 91.

Receiving medium 46 can be, for example, a silver halide false sensitized color paper. One such a medium is disclosed in U.S. Pat. No. 4,619,892, granted on Oct. 28, 1986. The diode lasers used in the present invention have been selected to obtain the widest possible spectral separation. However, since the wavelength separation of the diode lasers is relatively small, 750 to 870 nm, the color paper must have sufficient speed differentials, as well as narrow spectral response, in order to give good color separation and reproduction without punchthrough. Since a false color system is being used, the layer forming a given image dye color can be any of the layers (top, middle, or bottom) and exposed by any op the three wavelengths.

This invention has been described in detail with particular reference to the preferred embodiment thereof, but i: will be understood that variations and modifications can be effected within the spirit and scope of the invention.

We claim:
1. A laser printer comprising:
three diode lasers, each of said lasers being adapted to emit a beam of light at a wavelength different from the other lasers;
means for shaping the beams of light from each of said lasers, said shaping means including an apodizing mask associated with each of said lasers, each of said masks having an elliptical opening therein;
means for combining said beams of light to form a combined beam of light;
means for shaping said combined beam; and
means for scanning said combined beam onto a receiving medium.

2. A printer, as defined in claim 1, wherein said means for shaping said combined beam consists of achromatic optical elements.

3. A printer, as defined in claim 1, wherein said mean for shaping said combined beam includes a pair of spherical mirrors.

4. A laser printer comprising:
a plurality of lasers, each of said lasers being adapted to emit a beam of light at a wavelength different from the other lasers;
means for shaping the beams of light from each of said lasers, said shaping means including an apodizing mask associated with each of said lasers, one of said masks sizing one of said beams of light to a predetermined size, each of said other masks sizing another of said beams in accordance with a ratio of the square root of the wavelength of said other beam to the square root of the wavelength of said one beam;

means for combining said beams of light to form a combined beam of light;
means for shaping said combined beam; and
means for scanning said combined beam onto a receiving medium.

* * * * *

UNITED STATES PATENT AND TRADEMARK OFFICE
CERTIFICATE OF CORRECTION

PATENT NO. : 4,982,206
DATED : January 1, 1991
INVENTOR(S) : David Kessler and Chris P. Brophy It is certified that error appears in the above-identified patent and that said Letters Patent is hereby corrected as shown below:

On the Title Page at Code 54 "APODIZINE" should read -- APODIZING --.

Column 1, line 1, "APODIZINE" should read -- APODIZING --;
 line 19, "photograPhy" should read -- photography --; and
 line 22, "seParate" should read -- separate --.
Column 5, line 13, "431.2" should read -- -431.2 --; and
 line 51, "From" should read -- from --.
Column 6, line 33, "op" should read -- of --;
 line 37, "i:" should read -- it --; and
 line 57, "mean" should read -- means --.

Signed and Sealed this

Twenty-sixth Day of May, 1992

Attest:

DOUGLAS B. COMER

Attesting Officer

Acting Commissioner of Patents and Trademarks